METHOD OF MAKING HOT TOPS FOR INGOT MOLDS

Original Filed March 3, 1961

United States Patent Office

Re. 27,985
Reissued Apr. 23, 1974

27,985
METHOD OF MAKING HOT TOPS FOR INGOT MOLDS

Per Davidson, Sandviken, Sweden, assignor to Sandvik Aktiebolag, Sandviken, Sweden Original No. 3,123,878, dated Mar. 10, 1964, Ser. No. 93,133, Mar. 3, 1961. Reissue No. 25,905, dated Nov. 16, 1965, Ser. No. 438,447, Jan. 5, 1965. This application for reissue June 7, 1971, Ser. No. 358,301
The portion of the term of the patent subsequent to Nov. 23, 1982, has been disclaimed
Int. Cl. B22c *1/20;* B22d *7/10*
U.S. Cl. 164—6 4 Claims

Matter enclosed in heavy brackets [ ] appears in the original patent but forms no part of this reissue specification; matter printed in italics indicates the additions made by reissue.

ABSTRACT OF THE DISCLOSURE

*A method of making a self-supporting hot top sleeve comprising forming an aqueous slurry of a composition containing 82 to 94% by weight finely divided refractory material having an average grain size of 0.6 to 0.05 mm., 3 to 9% by weight organic fibrous material, 1 to 8% by weight binder, and up to 2.5% by weight inorganic fiber. The preferred composition contains 85 to 91% by weight refractory material and 1 to 4% by weight solid organic binder. The slurry is filtered under pressure through a porous mold to form a molded sleeve, which is then dried and baked at a temperature of 120° to 200° C.*

Figure 1:
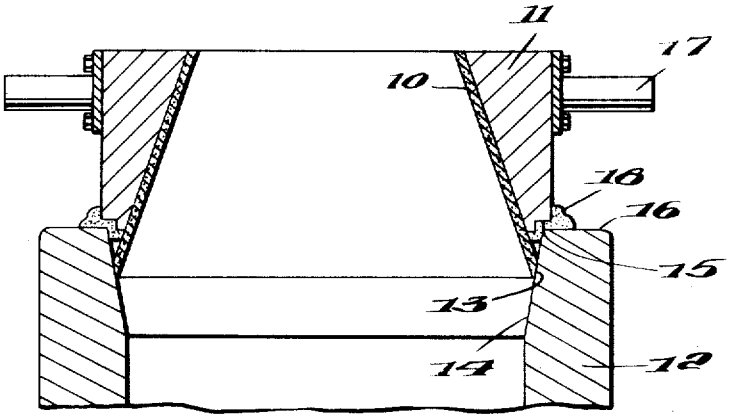

This application is a continuation-in-part of my application Serial No. 861,098, now U.S, Patent No. 3,072,981, filed Dec. 21, 1959.

The present invention relates to hot tops for ingot molds for casting steel and other metals.

The invention resides in a thin inner disposable sleeve of a particular composition to be described more fully hereinafter and an outer sleeve which serves to position and support said inner sleeve.

For a long time there has been a need for a hot top for ingot molds which is inexpensive both as to the cost of its ingredients or composition and as to the cost of its production, which will provide good heat insulation for the cast metal and give a smooth surface on the cast metal, free of insertions, fins, blisters and the like and which has good shape permanence and storing properties. Hot tops heretofore available generally have lacked one or more of these desirable qualities.

The present invention provides a hot top having the desirable qualities enumerated above and other advantages which will be referred to in the following description.

In accordance with the present invention the inner sleeve of the hot top is formed by depositing a layer of the desired thickness of the solid components of a composition consisting essentially of 82 to 94% by weight of a finely divided refractory or fire-proof material such as quartz or silicon compounds such as silicates, olivine or [magnesite] *magnesia,* 3 to 9% by weight of an organic fibrous material such as cellulose, paper pulp, waste paper pulp or the like, 1 to 8% by weight of a binder such as an organic glue, up to 2.5% by weight of a mineral fiber material such as asbestos, glass wool or the like and water or other suitable liquid in quantity sufficient to give a suspension or slurry, upon a porous mold. The so-formed layer, after being sucked sufficiently free of liquid to be self supporting is stripped from the mold and dried and baked at a temperature of from 120 to 200° C., preferably 140°–160° C.

The inner sleeve, made as described above, generally is frusto-conical in shape and is in a single piece but the invention embraces sleeves of other shapes, e.g., cylindrical as well as sleeve of all shapes formed in two or more pieces adapted to be fitted together to provide the desired shape.

The inner sleeve described above, when molded as described, has a porous internal structure which is held together by the fibrous ingredients of the composition, and a relatively smooth hard surface or surface layer. This is important as will appear hereinafter principally because it permits the production of castings having a smooth surface in that portion thereof within the hot top.

The hot top inner sleeve made as described above is placed on the ingot mold so that its lower edge bears tightly against the inner surface of the mold adjacent the upper end thereof. In order to attain a tight fit between the inner sleeve and the ingot mold of the lower edge of the sleeve preferably is beveled or chamfered so that the beveled surface bears against the surface of the mold. Generally the walls of the mold diverge upwardly at least adjacent the top of the mold and the beveled surface of the sleeve will rest upon this outwardly divergent surface of the mold. Preferably the surface of the mold at least adjacent the upper end is at an angle to the axis of the mold of at least 2° and the angle may be as great as 10° or more but preferably within the range from 4° to 8°. With such an outwardly inclined mold surface and the lower edge of the sleeve beveled at a corresponding angle a tight joint between the mold and the sleeve is provided and the formation of fins which is quite common with hot tops heretofore available is avoided.

After the inner sleeve has been placed upon the mold as described above an outer sleeve of about the same height as the protruding portion of the inner sleeve and of the same size and shape is placed on top of the mold over the inner sleeve. This outer sleeve which is made of metal or other durable material and has considerable thickness and weight serves to hold the inner sleeve in place during a casting operation and particularly to prevent the inner sleeve from being displaced upwardly by the pressure of the liquid metal being cast. After a casting operation has been completed the inexpensive inner sleeve is discarded while the outer supporting sleeve is saved for repeated use.

The invention will now be described in greater detail in connection with the accompanying drawings which illustrate an embodiment of the invention.

Figure 2:
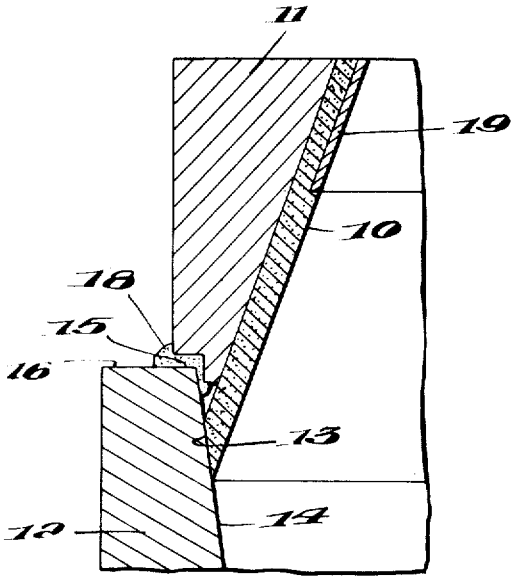
Figure 3:
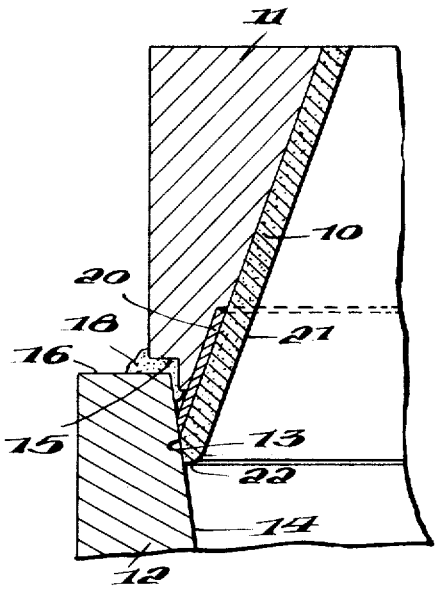

Referring to the drawings:

FIG. 1 is a vertical sectional view of the upper end of an ingot mold and the associated hot top, FIG. 2 is a similar sectional view of only the upper left hand side of an ingot mold and the associated hot top showing a modification including a suitably positioned mass of exothermic material, and FIG 3 is a view similar to FIG. 2 showing another modification including an annular supporting liner positioned around the lower end of the hot top.

In the drawings 12 is the ingot mold having upwardly divergent surfaces 14 adjacent the upper end thereof. 10 is the hot top inner sleeve described above which, as stated, may be in one piece or formed of two or more pieces fitted together. 11 is the supporting outer sleeve. The composition of the inner sleeve has been partially described above but it may be said here that the quartz ingredient of the composition need not be pure quartz but may contain a minor proportion of the rock material other than quartz normally associated with natural quartz deposits. A variety of refractory materials may be substituted for the quartz such as olivine, [magnesite] *magnesia, burned* dolomite, blast furnace and other slags, sand and the like. The average grain size of the refractory ingredient of the composition i.e. the quartz or its equivalent is less than 1 mm., and preferably less than 0.3 mm. or even less than 0.2 mm. As a rule the refractory material is chosen with an average grain size within the range from 0.6 to 0.05 mm. determined by the standard screening method. The grain size of the refractory material may also be described as being mainly less than 100 mesh The organic fibrous ingredient of the composition, as stated above, preferably is cellulosic such as ground wood pulp, or so-called mechanical pulp or pulp made from waste paper formed of such mechanical pulp and may contain chemical pulp e.g. sulfate or sulphite pulp. Other similar organic fibrous materials may be used either alone or in admixture with the wood pulp or paper pulp.

The organic glue ingredient of the composition may be a synthetic resin glue such as a urea or carbamide resin or silicone resin blue or a well known animal or vegetable glue or a cellulose derivative glue. [It is even possible to substitute the organic glue or binder, wholly or in part by an inorganic binder such as water glass.] The glue or binder generally is added to and mixed with the other ingredients in liquid form but it is also possible to mix the binder in finely divided solid form. Binder in liquid form generally is used in quantity within the range from 3% to 8% by weight while solid binder generally is used in quantity within the range from 1% to 4%.

The mineral fiber ingredient of the composition, e.g. if used, is asbestos, rock wool or the like and generally is used in quantity within the range from 0.5% by weight to 2.5% by weight. The mineral fiber serves mainly merely to supplement the organic fibrous ingredient and to increase the strength and durability of the hot top and may if desired be omitted entirely.

As stated above the composition from which the inner sleeve is formed, in the form [af] *of* suspension or slurry, is deposited on a mold. For example a porous mold may be positioned with one side immersed in the suspension and pressure applied to the suspension and/or suction applied to the other side of the mold whereby the liquid part of the suspension is forced through the mold and the solids are deposited as a filter cake on the mold. The operation is continued until the desired thickness is obtained. Then, as stated, the filter cake is removed from the mold and dried for from 1 to 5 hours, preferably 2 to 3 hours at a temperature of 120° to 200° C., preferably 140° to 160° C. The molding and drying operations give the molded sleeve a smooth hard surface which may be attributed to the molding composition used and/or to the drying operation but the drying temperature appears to be an essential condition.

In a preferred embodiment of the invention the molding composition consists of from 85 to 91% of the finely divided refractory material consisting mainly of quartz, 3 to 9% and preferably 4–8% of organic fibrous material such as disintegrated waste paper, 1–7% and preferably from 3 to 6% of synthetic resin glue such as a urea or carbamide resin and up to 2% and preferably from 0.4 to 1.5% of asbestos or its equivalent.

In a specific embodiment the wall thickness of the sleeve 10 may be within the range from 5 to 15 mm. The lower edge 13 of the sleeve 10 rests on the surface 14 of the ingot mold 12 and is supported externally by the sleeve 11. The lower edge of the sleeve preferably is beveled or chamfered so as to provide an edge surface at the same angle as the surface 14 of the ingot mold and thus to provide a better contact between the sleeve and the mold. The inclination of the chamfered surface of the lower edge 13 and of the surface 14 is within the range from 2 to 10°, preferably 4 to 8°, to the axis of the mold. It is within the scope of my invention to provide the ingot mold with an internal groove or shoulder into or on which the lower edge of the sleeve rests in order to provide a tight joint between the hot top and the mold.

The sleeve 11, as shown in the drawing, is provided with a step or shoulder 15 which rests upon the upper surface 16 of the ingot mold and limits its downward movement with respect to the mold and to the sleeve 10. Thus the relatively fragile sleeve 10 will not be forced to support the whole weight of the sleeve 11 through these parts are designed so that the sleeve 11, which is put in place after the sleeve 10, will hold the latter down in firm contact with the mold. The sleeve 11 preferably is formed of cast iron, concrete, cement, brick or the like, and may be unitary or made up of two or more pieces which fit together. It may be provided with recesses or channels containing only air or a heat insulating material such as asbestos. For instance the sleeve 11 may consist merely of an outer shell spaced apart from the sleeve 10 with the space between said outer shell and the sleeve 10 filled with an insulating and refractory material such as sand, brick or the like.

The sleeve 11 is provided with handles 17 to facilitate handling.

In practice it is advisable in some instances to use a packing material such as sand, glass wool, rock wool, steel wool, asbestos, putty, cement, straw or the like in the joint between the sleeve 11 and the mold 12 as shown at 18 in order to improve the tightness of the joint between the hot top and the mold.

The structures illustrated in FIGS. 2 and 3 are similar to that shown in FIG. 1 described above excepting that in the modification shown in FIG. 2, the sleeve 10 is provided with an annular recess containing a layer 19 of exothermic material. This exothermic material is ignited by the heat of the metal in the mold and serves to heat and thus to delay the solidification of the motion metal adjacent the edge of the upper end thereof and thus to prevent or reduce the formation of a sink in the top of the ingot. A variety of exothermic materials or compositions are available such as a mixture of aluminum powder and iron oxide. Other arrangements of the exothermic material are possible e.g. the exothermic material may be merely applied to the surface of the sleeve without providing a recess therein or the whole upper end of the sleeve may be a section formed of exothermic composition.

In the embodiment shown in FIG. 3 a replaceable liner 20 of suitable material such as sheet iron, fitted into a recess in the wall of the sleeve 11 may be provided in order to improve the tightness of the joint between the mold and the hot top and to prolong the useful life of the sleeve 11.

Another modification which is illustrated in FIG. 3 is the omission of the thin, sharp edge formed between the chamfered surface 13 and the inner surface 21 so as to provide a rounded edge 22. This greatly reduces breakage of the lower edge of the sleeve as it is handled in storage and use.

As has been indicated the sleeve 10 is first set on the ingot mold, and the sleeve 11 is then lowered over it. The packing material 18 may be applied either before or after or both before and after the sleeve 11 is applied.

Specific examples of suitable inner sleeve compositions are as follows, the parts being in percent by weight.

| | a | b | c | d | e |
|---|---|---|---|---|---|
| Paper pulp | 5.3 | 6.2 | 6.0 | 7.5 | 9.0 |
| Binder (liquid) | 6.4 | 4.2 | 5.2 | 6.5 | 7.0 |
| Asbestos | 1.5 | 0.5 | 0.8 | 1.0 | 1.5 |
| Refractory material | 86.8 | 89.1 | 88.0 | 85.0 | 82.5 |

Composition c is at present preferred.

Hot tops in accordance with the invention as described above give excellent results. The expandable inner sleeves thereof are inexpensive both as to the materials employed and the cost of manufacture. They have good storing properties, i.e. they are sufficiently strong that there is very little breakage due to handling and they do not change shape or otherwise deteriorate in storage. They provide good heat insulation and give castings with smooth surfaces and ingot tops which are free of porosity.

The outer sleeve 11 has a long life so that only inexpensive parts ar consumed i.e. the sleeve 10, the exothermic material 20, if it is used, and the packing 18. Pipes and segregations in the castings are minimized. This is of greate economical importance because only a very small amount of the ingot head has to be returned to scrap metal. For example the yield of ingots made with the hot tops of the present invention is about 94% which is substantially greater than with other hot tops heretofore commonly used.

It may be observed that the organic fibrous material facilitates the binding together of the finely divided refractory material and at the same time contributes a certain degree of porosity to the hot top structure which enhances its insulating properties. At the same time either due to the limited quantity of organic material including binder used or to the porosity or both no objectionable or harmful formation and liberation of gas occurs.

Regarding the thickness of the sleeve 10, which as stated may be within the range from 6 to 15 mm., depending upon the size thereof, it may be said that a suitable thickness for a sleeve adapted to be used in casting a 1.7 ton ingot is about 12 mm. The sleeve 10 generally is of uniform thickness but it is within the scope of my invention to vary the thickness, e.g. to make the sleeve thicker at the end adjacent to the mold and thinner adjacent to the other end.

I claim:

1. Method of making a hot top disposable sleeve which comprises forming said sleeve out of a composition consisting essentially of from 82% to 94% by weight of a finely divided refractory material having an average grain size within the range from [0.6] *0·3* to 0.05 mm., from 3% to 9% by weight of [an organic fibrous material] *paper pulp selected from the group consisting of mechanical paper pulp, chemical paper pulp, and pulps of paper* and from 1% to 4% by weight of a solid organic binder-material with sufficient water to give a moldable mixture, and drying and baking the molded sleeve at a temperature within the range from about 120° C. to 200° C., said sleeve being formed by filtering an aqueous slurry of the solid components of said composition under pressure through a porous mold.

2. Method as defined in claim 1 in which the composition comprises from 0.5% to 2.5% by weight of a fibrous inorganic material.

[*3. Method of making a hot top disposable sleeve which comprising forming said sleeve out of a composition consisting essentially of from 82% to 94% by weight of a finely divided refractory material having an average grain size of less than about one mm., from 3% to 9% by weight of an organic fibrous material and from 1% to 4% by weight of a solid organic binder material with sufficient water to give a moldable mixture, and drying and baking the molded sleeve at a temperature within the range from about 120° to 200° C., said sleeve being formed by said composition under pressure through a porous mold.*]

[*4. Method of making a hot top disposable sleeve which comprises forming said sleeve out of a composition consisting essentially of from 82% to 94% by weight of a finely divided refractory material from 3% to 9% by weight of an organic fibrous material and from 1% to 4% by weight of a solid organic binder material with sufficient water to give a moldable mixture, and drying and baking the molded sleeve at a temperature within the range from about 120° C. to 200° C., said sleeve being formed by filtering an aqueous slurry of the solid components of said composition under pressure through a porous mold.*]

*5. A method as set forth in claim 1 wherein said finely divided refractory material is a silicon compound.*

*6. A method as set forth in claim 1 wherein said molded sleeve is self-supporting.*

References Cited

The following references, cited by the Examiner, are of record in the patented file of this patent or the original patent.

UNITED STATES PATENTS

| | | | |
|---|---|---|---|
| 1,119,364 | 8/1931 | Firth et al. | 249—60 X |
| 2,890,504 | 6/1959 | Daley et al. | 249—201 |
| 2,997,758 | 8/1961 | Tiberg et al. | 249—106 X |
| 3,066,069 | 11/1962 | Ednell | 162—227 |
| 3,072,981 | 1/1963 | Davidson | 249—197 |
| 1,523,209 | 1/1925 | Howard | 22—147 |
| 1,921,730 | 8/1933 | Charman | 22—147 |
| 2,390,500 | 12/1945 | Charman | 22—147 |
| 2,433,168 | 12/1947 | Staeger | 22—147 |
| 2,584,110 | 2/1952 | Blackburn | 22—147 |
| 2,757,426 | 8/1956 | Brennan | 22—147 |
| 2,886,869 | 5/1959 | Webb et al. | 22—147 |
| 2,925,637 | 2/1960 | Edmonds et al. | 22—147 |
| 3,076,239 | 2/1963 | Davidson | 22—147 |

FOREIGN PATENTS

| | | |
|---|---|---|
| 563,752 | 9/1958 | Canada. |
| 619,560 | 5/1961 | Canada. |
| 218,445 | 7/1924 | Great Britain. |
| 812,426 | 4/1959 | Great Britain. |

ROBERT D. BALDWIN, Primary Examiner

U.S. Cl. X.R.

106—38.35; 249—197